United States Patent
Zhang

(10) Patent No.: US 11,488,551 B1
(45) Date of Patent: Nov. 1, 2022

(54) PULSED BACKLIGHT UNIT IN LIQUID CRYSTAL DISPLAY DEVICE

(71) Applicant: Meta Platforms Technologies, LLC, Menlo Park, CA (US)

(72) Inventor: Rui Zhang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/824,600

(22) Filed: Mar. 19, 2020

Related U.S. Application Data

(60) Provisional application No. 62/894,009, filed on Aug. 30, 2019, provisional application No. 62/894,016, filed on Aug. 30, 2019.

(51) Int. Cl.
*G09G 3/36* (2006.01)
*G02F 1/13357* (2006.01)
*G02F 1/1335* (2006.01)

(52) U.S. Cl.
CPC ..... *G09G 3/3607* (2013.01); *G02F 1/133603* (2013.01); *G02F 1/133609* (2013.01); *G09G 3/3688* (2013.01); *G02F 1/133612* (2021.01); *G09G 2310/0235* (2013.01); *G09G 2310/08* (2013.01)

(58) Field of Classification Search
CPC .............. G09G 3/3607; G09G 3/3688; G09G 2310/0235; G09G 2310/08; G02F 1/133603; G02F 1/133609; G02F 2001/133612
See application file for complete search history.

(56) References Cited

U.S. PATENT DOCUMENTS

| | | | |
|---|---|---|---|
| 2008/0198114 A1 | 8/2008 | Roberts et al. | |
| 2014/0125644 A1* | 5/2014 | Guo | G09G 3/3648 345/88 |
| 2016/0196799 A1 | 7/2016 | Ahn et al. | |
| 2016/0217752 A1* | 7/2016 | Shin | G09G 3/3607 |
| 2017/0041598 A1* | 2/2017 | Smithwick | H04N 13/30 |
| 2017/0285423 A1* | 10/2017 | Kita | G02F 1/1368 |
| 2019/0278135 A1* | 9/2019 | Woodgate | G02B 19/0028 |
| 2019/0318701 A1* | 10/2019 | Huang | G09G 3/3406 |
| 2020/0103705 A1* | 4/2020 | Chen | H05B 45/32 |

(Continued)

FOREIGN PATENT DOCUMENTS

WO WO-2013044200 A1 * 3/2013 ......... G02F 1/133603

OTHER PUBLICATIONS

Non-Final Office Action dated Jun. 28, 2021 for U.S. Appl. No. 16/824,640, filed Mar. 19, 2020, 12 pages.

*Primary Examiner* — Vinh T Lam
(74) *Attorney, Agent, or Firm* — Fenwick & West LLP

(57) ABSTRACT

To increase the spatial resolution of a liquid crystal display (LCD) device, instead of emitting colors of an image (e.g., the three primary colors) in a single frame, the colors of an image are emitted sequentially. For example, if the colors of the image are red, blue, and green, the colors are emitted sequentially at a rate three times the desired frame rate of the display. The colors are emitted from a backlight unit (BLU) that produces pulses of colored light successively. By emitting colors sequentially, the number of subpixels in a pixel can be decreased or eliminated. Thus, among other advantages, the size of each pixel can decrease and the spatial resolution of the display device (e.g., pixels per inch) can increase.

22 Claims, 8 Drawing Sheets

(56) References Cited

U.S. PATENT DOCUMENTS

| | | |
|---|---|---|
| 2020/0243028 A1* | 7/2020 | Shimoshikiryoh .... G09G 3/006 |
| 2020/0335050 A1 | 10/2020 | Maeda et al. |
| 2020/0357353 A1* | 11/2020 | Lee ................ G09G 3/3688 |
| 2021/0012724 A1* | 1/2021 | Wang .............. G09G 3/3413 |
| 2021/0110778 A1* | 4/2021 | Xiao ............... G09G 3/3618 |
| 2022/0005427 A1* | 1/2022 | Lang ............... G09G 3/3688 |

\* cited by examiner

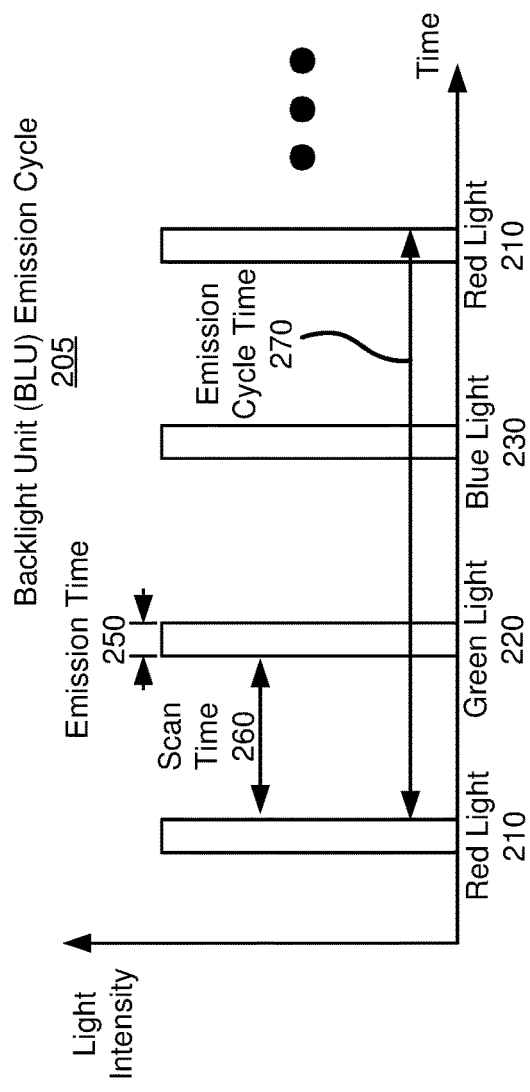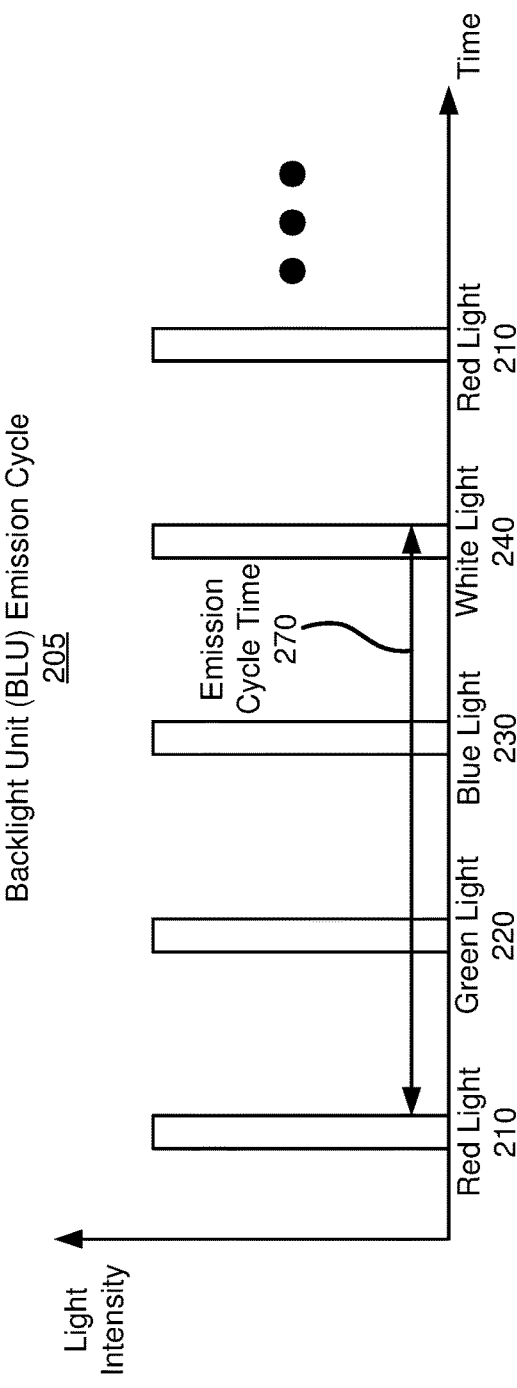
FIG. 2A
FIG. 2B

Emit pulses of colored light from a BLU, wherein colored light of a first pulse includes first and second colors and colored light of a second pulse include a third color
910

Block the second color but passing the first primary color and the third primary color by first subpixels in an LCD panel positioned in front of the BLU
920

Block the first color but passing the second color and the third color by second subpixels in the LCD panel
930

FIG. 9

PULSED BACKLIGHT UNIT IN LIQUID CRYSTAL DISPLAY DEVICE

CROSS REFERENCE TO RELATED APPLICATIONS

This application claims the benefit of U.S. Provisional Application No. 62/894,009, filed Aug. 30, 2019 and U.S. Provisional Application No. 62/894,016, filed on Aug. 30, 2019, which are incorporated by reference in their entirety.

BACKGROUND

The present disclosure relates to display devices, and specifically, to display devices with a backlight unit (BLU) that emits pulses of colored light.

Liquid-crystal displays (LCDs) are flat-panel displays that use the light-modulating properties of liquid crystals. Liquid crystals do not emit light directly, but use a backlight or reflector to provide the light for displaying an image. LCDs are available to display arbitrary moving images or fixed images.

Each pixel of an LCD includes a layer of liquid crystal molecules aligned between two transparent electrodes, and two polarizing filters (parallel and perpendicular), the axes of transmission of which are (in most of the cases) perpendicular to each other. By controlling the voltage applied across the liquid crystal layer in each pixel, light can be allowed to pass through the pixel in varying amounts. Color LCDs use the same technique with the addition color filters and subpixels within the pixel. Each subpixel includes a filter that only passes a single color, such as red, green, or blue light. However, due to providing three subpixels in each pixel, the size, and thus the spatial resolution of the LCD, can be limited.

SUMMARY

Embodiments relate to a display device comprising a backlight unit (BLU), a liquid crystal display (LCD), and an LCD driver circuit. The BLU emits pulses of colored light. The LCD panel includes a plurality of pixels and is positioned in front of the BLU. The LCD driver circuit controls the plurality of pixels to selectively pass portions of the pulsed colored light from the BLU through the plurality of pixels.

In some embodiments, the LCD driver programs the plurality of pixels for each of the pulses of color light before the BLU emits each of the pulses of the colored light.

In some embodiments, the BLU emits red light, green light, and blue light in a sequence. In some embodiments, the sequence is predetermined.

In some embodiments, the LCD panel does not include color filters.

In some embodiments, the BLU includes a light guiding plate and a plurality of light-emitting diodes (LEDs) arranged along one or more peripheries of the light guiding plate to emit pulses of the colored light to the LCD panel via the light guiding plate.

In some embodiments, the display device includes a timing controller that controls a time duration of each pulse of colored light to adjust a color balance. In some embodiments, the timing controller also synchronizes the pulses of colored light emitted from the BLU with an operation of the LCD driver. In some embodiments, the time duration is less than or equal to 2 milliseconds and a rate of the pulses of the colored light is from 216 hertz to 270 hertz.

In some embodiments, the LCD driver circuit comprises a gate driver having gate terminals and each gate terminal sends a gate signal to a plurality rows of the pixels in the LCD panel. In some embodiments, the LCD driver circuit further comprises a data driver having data terminals. Each data terminal sends a data signal to a subset of the pixels in a column of the pixels in a time multiplexed manner via one of a plurality of data lines. More than one of the data lines extends between adjacent columns of the pixels.

BRIEF DESCRIPTION OF DRAWINGS

FIG. 2A is a timing diagram illustrating a backlight unit (BLU) emission cycle with three light pulses per cycle, according to an embodiment.

FIG. 2B is a timing diagram illustrating a BLU emission cycle with four light pulses per cycle, according to an embodiment.

FIG. 9 is a flow chart illustrating another method for operating a display device, according to an embodiment.

The figures depict various embodiments of the present disclosure for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit of each reference number corresponds to the figure in which the reference number is first used.

Embodiments relate to a liquid crystal display (LCD) device with a backlight unit (BLU) that emits pulses of colored light to increase the spatial resolution of the device. Instead of using color filters for each subpixel, the BLU emits colored light (e.g., red, green, and blue light) sequentially. After all the pixels are programmed, the BLU emits a pulse of colored light. Thus, by coordinating the pixels with the pulses of colored light, each pixel can emit any color.

Figure 1:
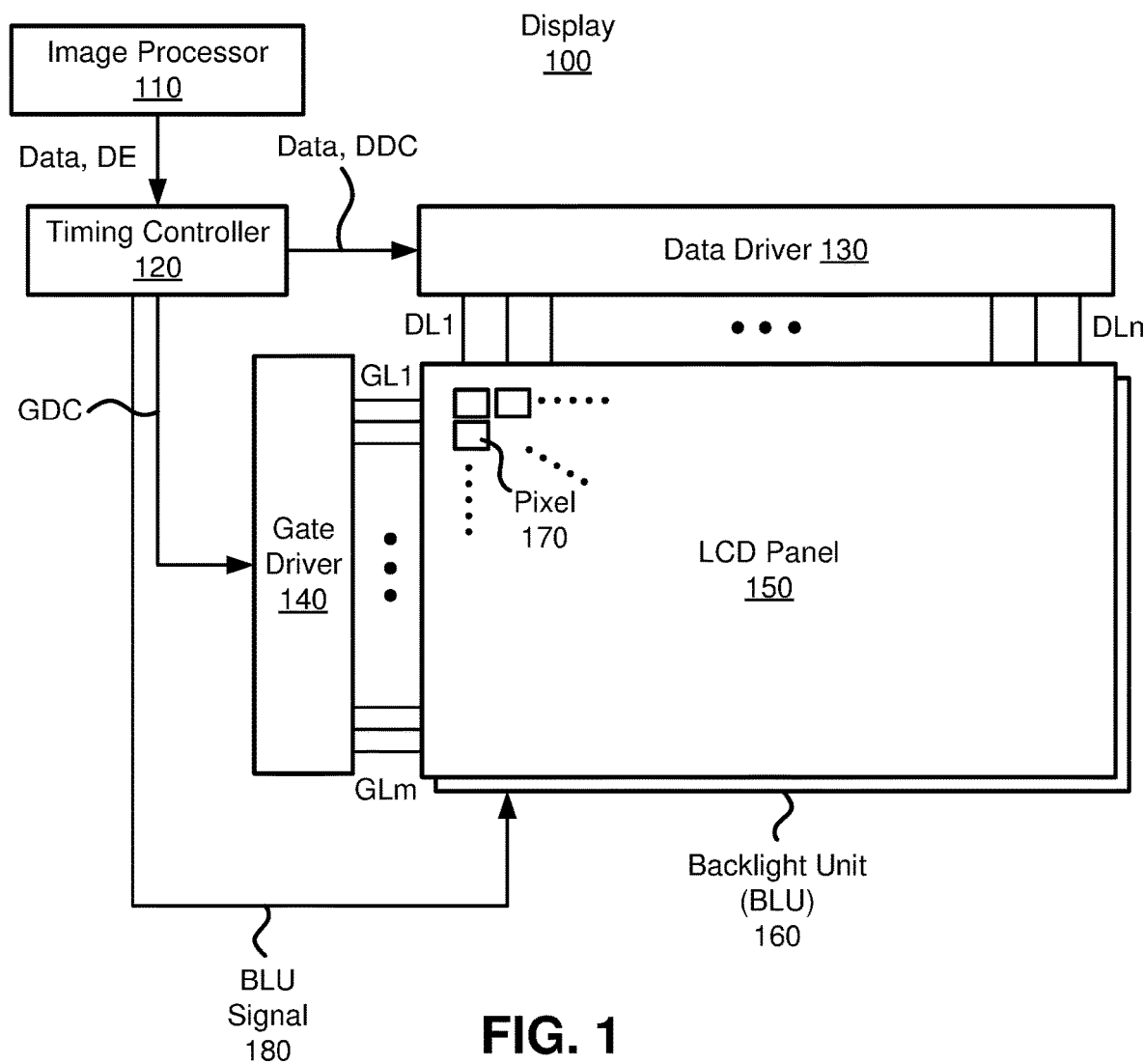
FIG. 1 is a schematic block diagram of a display, according to an embodiment.

FIG. 1 is a schematic block diagram of a display 100, according to an embodiment. An image can be displayed on the display 100 by selectively emitting light from pixels 170 of the LCD panel 150. To do this, the display 100 includes an image processor 110, a timing controller 120, a data driver 130, a gate driver 140, an LCD panel 150, and a BLU 160. The gate driver 140 and the data driver may be referred to as the LCD driver circuit. The image processor is connected to the timing controller 120. The timing controller 120 is connected to the data driver 130, the gate driver 140, and the BLU 160. The data driver 130 is connected to pixels 170 of the LCD panel by data lines DL1 to DLn, and the gate driver 140 is connected to pixels 170 of the LCD panel 150 by gate lines GL1 to GLm. The BLU 160 is behind the LCD panel 150 and may be connected to the LCD panel 150.

The image processor 110 outputs a data enable signal DE along with a data signal DATA. Additionally, the image processor 110 may output a vertical synchronization signal, horizontal synchronization signal, and clock signal (not shown).

The timing controller 120 controls the LCD panel 150 and the BLU 160. For example, the timing controller BLU 160 synchronizes light emitted from the BLU 160 with operations of the LCD panel 150. The timing controller 120 can also control a time duration of each pulse of colored light. For example, referring to FIG. 2, the timing controller 120 can control the emission time, the scan time, and the emission cycle time. Based on the signals received from the image processor 110, the timing controller 120 outputs signals to control the LCD panel 150 and the BLU 160. The timing controller 120 transmits BLU signals 180 to the BLU 160, transmits gate timing control signals GDC to the gate driver 140, and transmits timing control signals DDC to the data driver 130.

In response to the data timing control signal DDC supplied from the timing controller 120, the data driver 130 samples and latches the data signal DATA supplied form the timing controller 120, converts it to a gamma reference voltage, and outputs the gamma reference voltages to the LCD panel 150 through data lines DL1 to DLn. The data driver 130 may an IC (integrated circuit). In response to receiving the gate timing control signal GDC from the timing controller 120, the gate driver 140 produces a gate signal. The gate driver 140 has gate terminals (not shown in FIG. 1) and each of the gate terminals sends a gate signal, via the gate lines GL1 to GLm, to a row of pixels 170. The gate driver 140 may be a separate IC, or formed on the LCD panel 150 by gate-in-panel (GIP) technology.

The BLU 160 illuminates the LCD panel 150 from the side or back of the LCD panel 150. Unlike conventional BLU's, the BLU 160 sequentially emits pulses of colored light. For example, the BLU 160 emits primary colors in a sequence (such as red light, green light, and blue light). The sequence may also include white light. In some embodiments, the BLU 160 emits pulses of light that include multiple colors, such as red and blue light in a first pulse and green light in a second pulse. The BLU 160 is further described with reference to the remaining FIGs.

The LCD panel 150 is positioned in front of the BLU 160 and includes an array of pixels 170. The LCD panel 150 controls the pixels 170 to selectively pass portions of the pulsed colored light from the BLU 160 through the pixels 170. Thus, LCD panel 150 displays an image corresponding to the data signal DATA. Among other advantages, due to the BLU 160 emitting pulses of colored light, the pixels 170 can have fewer subpixels than conventional LCD displays. Thus, the pixels 170 may be smaller than conventional LCD displays. For example, the pixels 170 have may have no subpixels. In another example, each pixel 170 has two subpixels instead of three.

FIGS. 2A and 2B are timing diagrams illustrating example BLU emission cycles 205. The emission cycle 205 of FIG. 2A includes pulses of red light 210, green light 220, and blue light 230. The emission cycle 205 of FIG. 2B additionally includes a pulse white light 240. Including white light 240 in the BLU emission cycle 205 can increase the overall brightness of an image displayed by the display 100. The emission time 250 is the duration of time that the BLU 160 emits a pulse of light. The time between pulses is referred to as the scan time 260. The time to display each pulse once is the emission cycle time 270 and the emission cycle time 270 may be the frame rate of the display 100. For example, for FIG. 2A, the emission cycle time 270 is the sum of the emission times 250 for each pulse of light 210, 220, and 230, and the scan time 260 between the pulses.

In some embodiments, the frame rate of the display 100 ranges between 72 hertz (Hz) to 90 Hz. Thus, the frequency of the pulses may be between 216 Hz to 270 Hz. For example, a time duration to emit a pulse (e.g., the emission time 250 and the scan time 260 for a pulse) may be less than or equal to 2 milliseconds (ms).

In some embodiments, the pixels of the LCD panel 150 are programed prior to an emission of a pulse of light. Thus, the scan time 260 may be the time to program the pixels of the LCD panel 150 (e.g., the time to provide gate signals and data signals to the pixels 170). The emission time 250, scan time 260, and light intensity can be different for each pulse of light and may vary over time. For example, the color balance of an image can be changed by adjusting the emission times 250 of pulses, the light intensity of pulses, and the scan times 260 between pulses. Between pulses of light, the BLU 160 may not emit light. The order of the colors in the emission cycle 205 can be different than the orders shown in FIGS. 2A and 2B. Furthermore, the shapes of the pulses may be different than those shown in FIGS. 2A and 2B. For example, a pulse may have a triangular shape such that the light intensity of a pulse changes over the duration of the pulse.

Figure 3A:
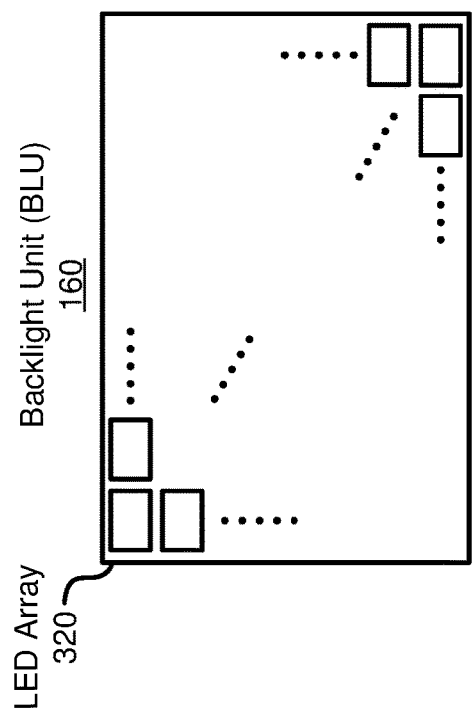
FIGS. 3A and 3B are plane views illustrating BLUs, according to embodiments.
Figure 3B:
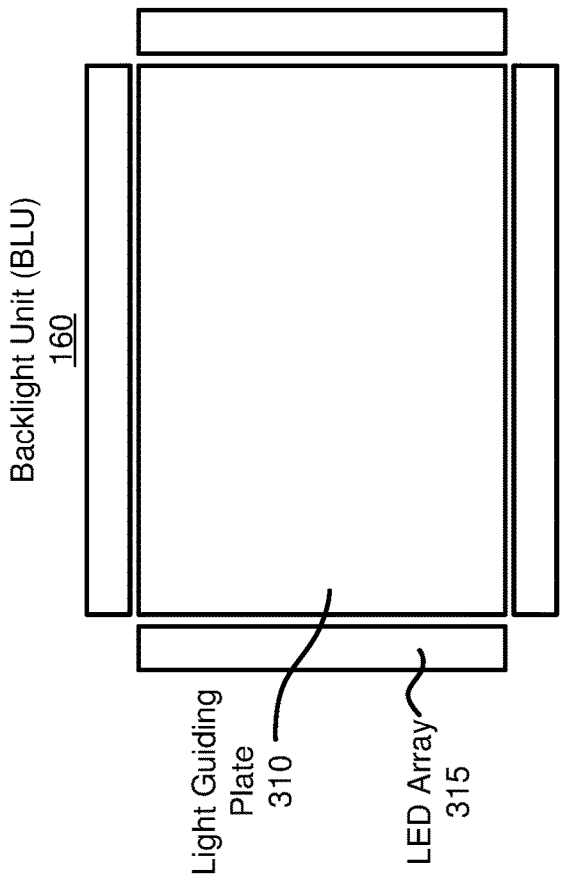

FIGS. 3A and 3B are plan views illustrating BLUs 160, according to embodiments. Each of the BLU's 160 include an array of light-emitting diodes (LEDs) and can emit light by selectively applying power to subsets of LEDs in the arrays. The array can include multiple types of LEDs. For example, the array includes red, green, blue, and white LEDs. In some embodiments, the LEDs are microLEDs and the feature size (e.g., the diameter) and the pitch (e.g., spacing between LEDs) of each microLED is in the sub-micron (e.g., ~0.1 um) to 10 micron range. In FIG. 3A, the BLU 160 includes an LED array 320 of colored LEDs that can emit pulses of light towards the LCD panel 150. In FIG. 3B, the BLU 160 includes a light guiding plate 310 surrounded by four LED arrays 315 that emit pulses of light towards the light guiding plate 310. The light guiding plate 310 can be a passive optical structure that redirects light from the LED arrays 315 towards the LCD panel 150. The light guiding plate 310 can also include optical structures that diffuse and spread the light from the LED arrays 315. For example, the light guiding plate 310 is a flat glass substrate with a rough surface that spreads light from the LEDs.

Figure 4:
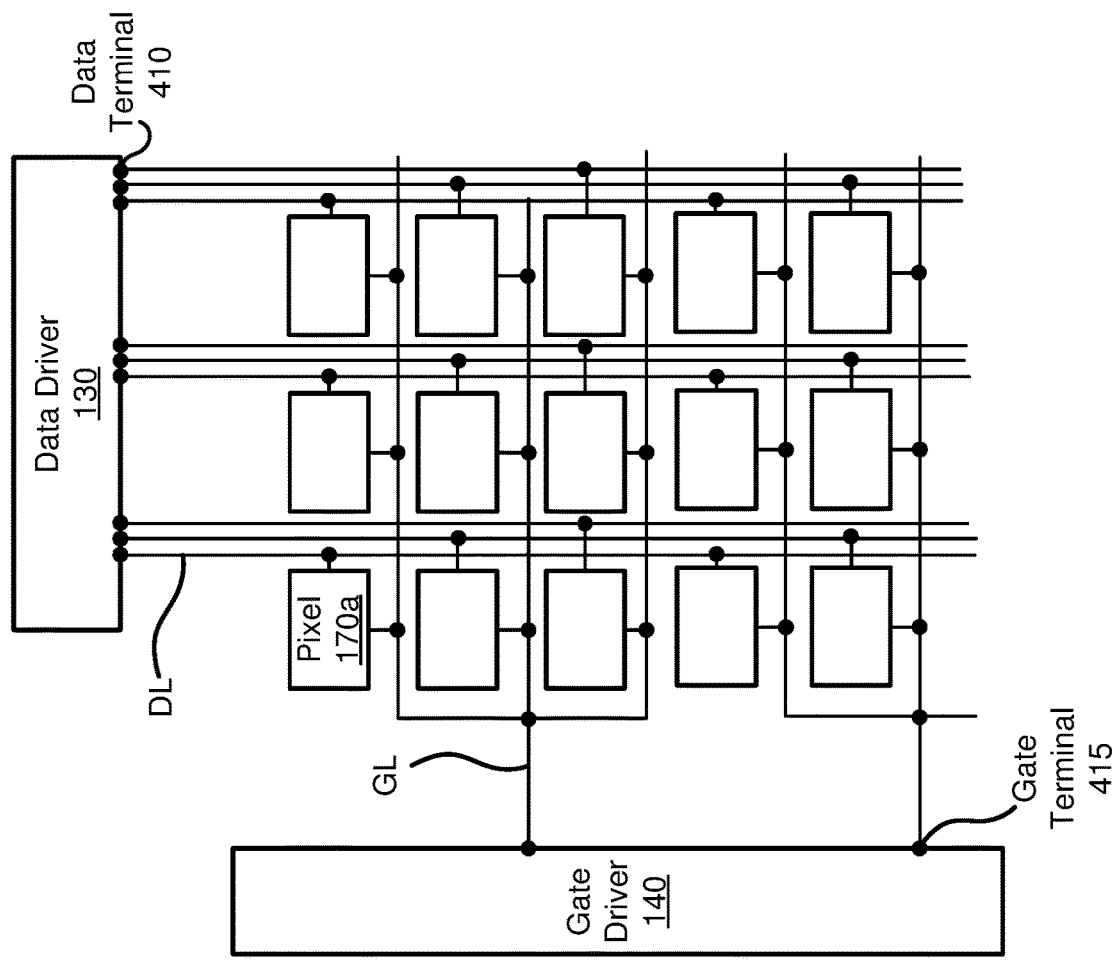
FIG. 4 is a schematic block diagram illustrating a portion of pixels connected to the data driver and the gate diver, according to an embodiment.

FIG. 4 is a schematic block diagram illustrating a portion of pixels 170a connected to the data driver 130 and the gate driver 140, according to an embodiment. Each pixel 170a is connected to a data line DL and a gate line GL. The gate driver 140 includes a series of gate lines GL each connected to the gate driver 140 by a gate terminal 415. Each gate line GL splits to connect to three rows of pixels 170a. The date driver 130 includes a series of data lines DL each connected to the data driver 130 by a data terminal 410. Among other advantages, each pixel 170a may not include subpixels.

Instead of each pixel 170a emitting multiple colors (via subpixels) at once, the colors are emitted sequentially by changing the color of light emitted from the BLU 160. Since each pixel may not have subpixels, the size of each pixel 170a can be reduced and, as a result, the spatial resolution of the display 100 can be increased.

For each column of pixels 170a, three data lines DL connect the column to the data driver 130. For example, a first pixel 170a in a pixel column is connected to a first data line DL, a second pixel 170a in the column is connected to a second data line DL, a third pixel 170a in the column is connected to third data line DL, a fourth pixel 170a in the column is connected to the first data line DL, a firth pixel 170a in the column is connected to the second data line DL, etc.

Using commonly connected gate lines across three rows of pixels is advantageous, among other reasons, because three rows of pixels 170a can be programmed simultaneously by supplying a single gate signal from a gate line GL. Data signals corresponding to each pixel of the three rows of pixels 170a can be programmed via the data lines DL without increasing the number of date lines DLs running along the column of pixels. That is, a conventional LCD includes three data lines running across a column of pixels to program three sub-pixels (e.g., red, green, and blue pixels). Since the pixels 170a in the embodiment of FIG. 4 do not have subpixels, the same number of data lines may be used to program pixels in three different rows. By using such common connections of gate lines across three rows of pixels, the scan time for programming the pixels can be decreased by a third relative to connecting each row of the pixels to a single gate line.

In some embodiments, each pixel 170 of the LCD panel 150 includes two subpixels. In these embodiments, instead of programming the BLU 160 to sequentially emit three pulses of light to display an image, an image can be displayed by programming the BLU 160 to sequentially emit two pulses of light. Specifically, the subpixels can include color filters and the pulses of light can includes multiple colors. Among other advantages, an emission cycle with two pulses (instead of three) can reduce the emission cycle time. For example, if the display 100 to has a frame rate between 72 Hz to 90 Hz, the frequency of pulses may be between 144 Hz to 180 Hz (compared to 216 Hz to 270 Hz for emission cycles with three pulses). These embodiments are further described with reference to FIGS. 5-7.

Figure 5:
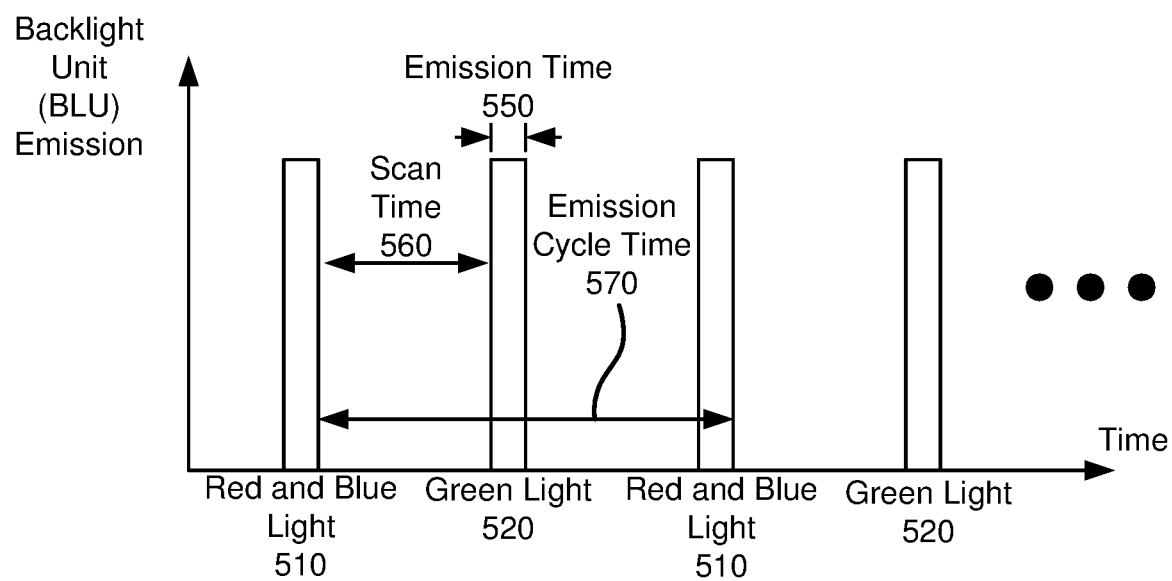
FIG. 5 is a timing diagram illustrating a BLU emission cycle with two pulses per cycle, according to an embodiment.

FIG. 5 is a timing diagram illustrating a BLU emission cycle 505 with two pulses per cycle, according to an embodiment. Additionally, each pulse of the emission cycle 505 may include multiple colors. In FIG. 5, the first pulse includes red and blue light 510 and the second pulse includes green light 520; however, alternative pulse color combinations are possible. Like FIGS. 2A and 2B, the duration of time of a pulse is the emission time 550, the time between pulses is the scan time 560, and the time to display each pulse once is the emission cycle time 570. Among other advantages, due to the emission cycle 505 having two pulses per image fame the scan time 560 can be longer compared to emission cycles 205 with three pulses per image frame.

Figure 6:
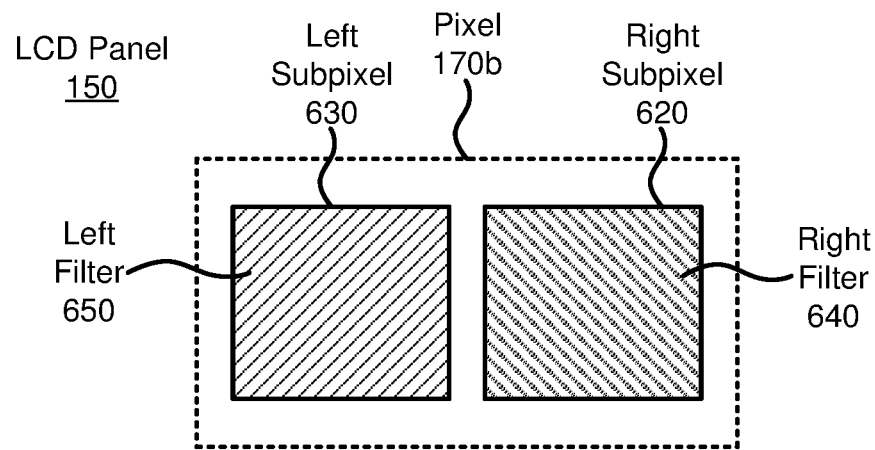
FIG. 6 is a plan view illustrating a pixel of the LCD panel with two subpixels, according to an embodiment.

FIG. 6 is a plan view illustrating a pixel 170b of the LCD panel 150, according to an embodiment. The pixel 170b includes a right subpixel 620 with a right filter 640 and a left subpixel 630 with a left filter 650. The LCD panel 150 can be programed to open each subpixel 620, 630 to allow light to pass through the pixel 170b. The LCD panel 150 can also be programmed to close each subpixel 620, 630 to block light from passing through the pixel 170b. Furthermore, the LCD panel 150 can be programed to partially open a subpixel, for example to allow smaller amounts of light to pass though the pixel 170b. Each filter 640, 650 can at least partially block one or more colors of light passing through and allow other colors of light to pass through. This is further described with reference to FIG. 7.

Figure 7:
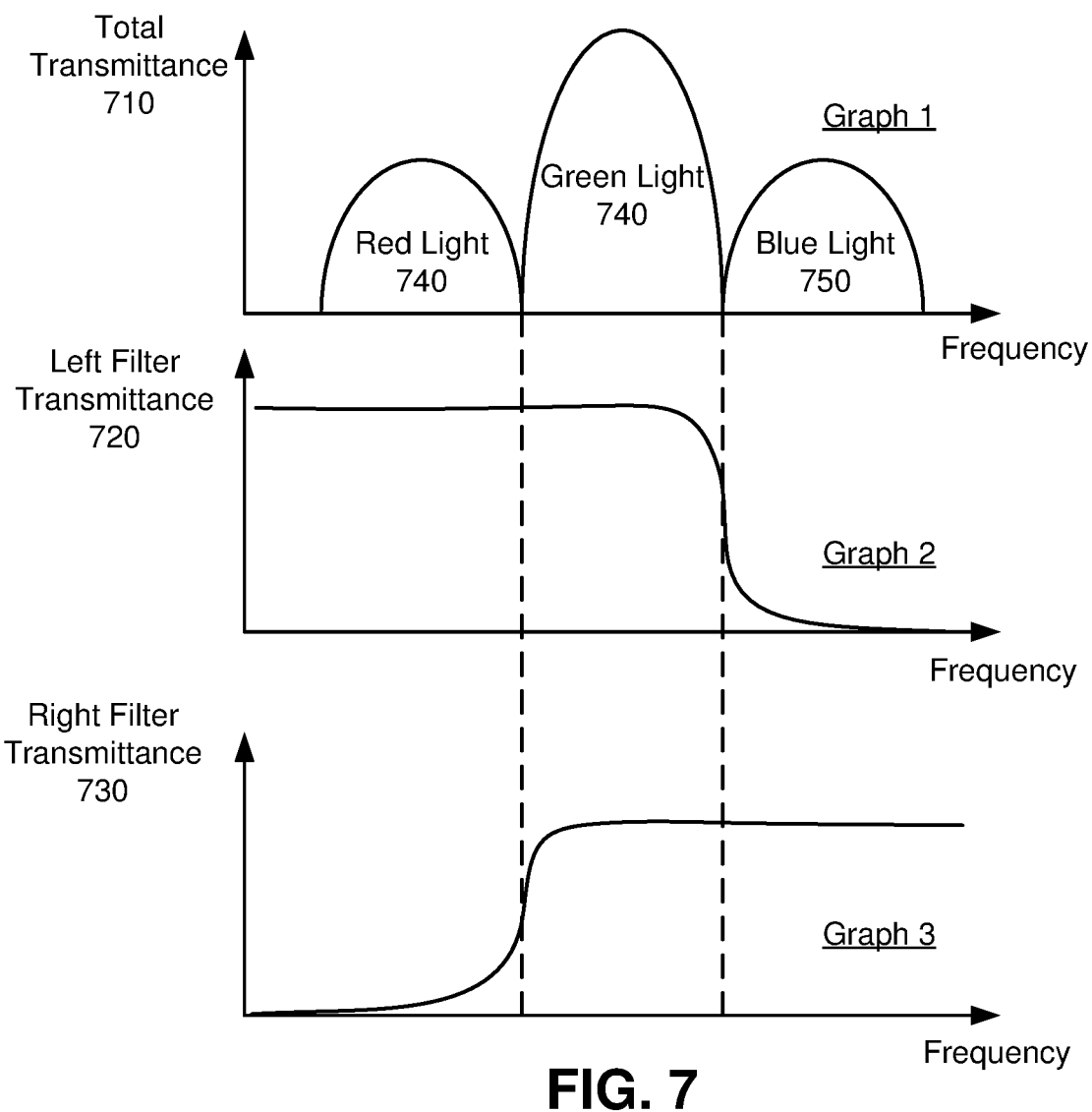
FIG. 7 are graphs illustrating the transmittance of the subpixel filters, according to embodiments.

FIG. 7 are graphs illustrating the transmittance of the subpixel filters 640, 650, according to embodiments. In the example of FIG. 7, the right filter 640 blocks red light 740 but allows green light 740 and blue light 750 to pass through, and the left filter 650 blocks blue light 750 but allows green light 740 and red light 740 to pass through. Graph 1 illustrates the total transmittance 710 of light of the combined filters 640, 650, Graph 2 illustrates the left filter transmittance 720 versus light frequency, and Graph 3 illustrates the right filter transmittance 730 versus light frequency. In Graph 1, the total transmittance of green light 740 is higher than the transmittance values of red light 740 and blue light 750 because both filters 640, 650 allow green light to pass through. In Graph 2, red and green frequencies have high transmittance values while blue frequencies have low (or zero) transmittance values. This signifies that the left filter 650 filters out blue light 750. In Graph 3, green and blue frequencies have high transmittance values while red frequencies have smaller (or zero) transmittance values. This signifies that the right filter 640 filters out red light 740.

Thus, by coordinating the filters 640, 650 with the light pulses emitted from the BLU 160, the pixel 170b can emit a desired color. For example, if the BLU 160 emits a first pulse of red and blue light and a second pulse of green light, the right filter 640 can be coordinated to block red light but allow blue and green light to pass through and the left filter 650 can be coordinated to block blue light but allow red and green light to pass through. Thus, for example, to emit red light from the pixel 170b, the LCD panel 150 can be programmed to open the left subpixel 630 and close the right subpixel 620. As the BLU 160 emits a pulse of red and blue light 510, red light will pass through the left subpixel 630 but blue light will be blocked by the left filter 650. To emit blue light from the pixel 170b, the right subpixel 620 can be opened and the left subpixel 630 can be closed. Due to the right filter 640, blue light will pass through the right subpixel 620 but red light will be blocked when the BLU 160 emits a pulse of red and blue light 510. To allow green light to emit from the pixel 170b, the LCD panel 150 may open one or both subpixels prior to the BLU 160 emitting a pulse of green light 520. Other example color combinations are possible. For example, if the BLU 160 emits a first pulse of green and red light and a second pulse of blue light, the right filter 640 can be coordinated to block red light and the left filter can be coordinated to block green light.

Figure 8:
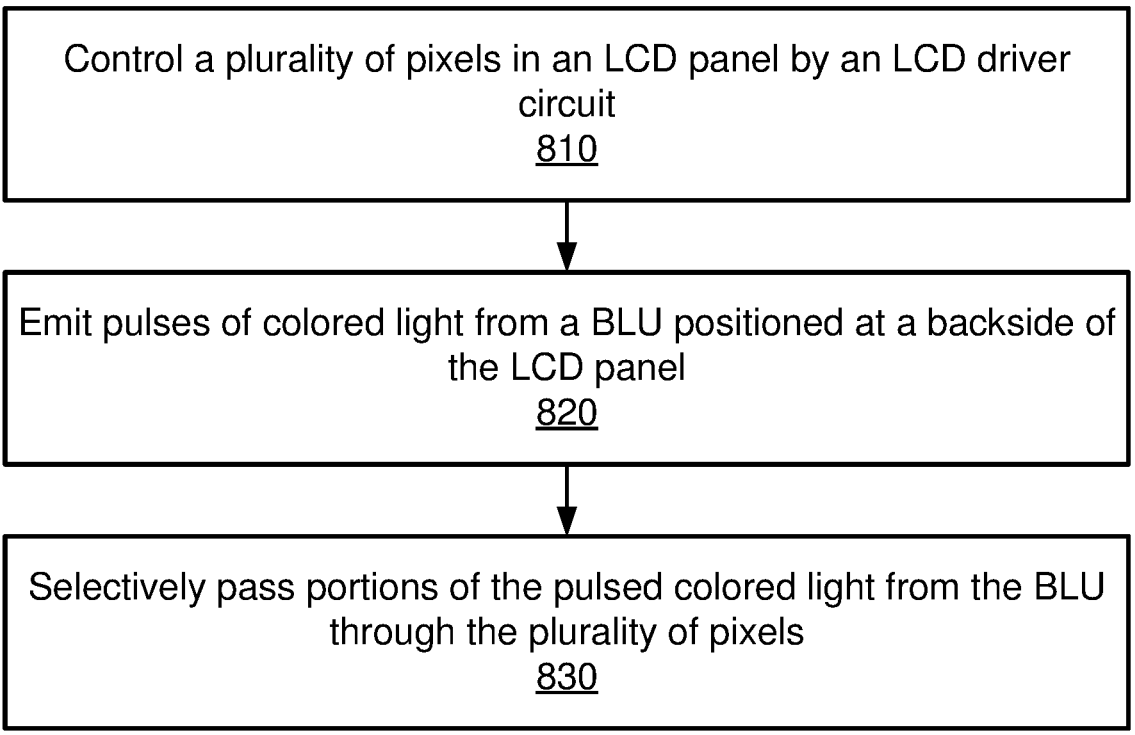
FIG. 8 is a flow chart illustrating a method for operating a display device, according to an embodiment.

FIG. 8 is a flow chart illustrating a method for operating a display device, according to an embodiment. The steps of method may be performed in different orders, and the method may include different, additional, or fewer steps.

A plurality of pixels in a liquid crystal display (LCD) panel is controlled 810 by an LCD driver circuit. The LCD driver circuit can program the plurality of pixels for each of the pulses of color light before the BLU emits each of the pulses of the colored light.

Pulses of colored light are emitted 820 from a backlight unit (BLU) positioned at a backside of the LCD panel. The BLU may emit red light, green light, and blue light in a predetermined sequence. In some embodiments, the BLU further emits white light in the predetermined sequence with the red light, the green light, and the blue light. The BLU can include a light guiding plate and a plurality of light-emitting diodes (LEDs) arranged along one or more peripheries of the light guiding plate to emit pulses of the colored light to the LCD panel via the light guiding plate.

Portions of the pulsed colored light from the BLU are selectively passed 830 through the plurality of pixels. The LCD panel may not include color filters. In some embodiments, a timing controller controls a time duration of each pulse of colored light by a timing controller to adjust a color balance. A time to emit a pulse of light may be less than or equal to 2 milliseconds and a rate of the pulses of the colored light is from 216 hertz to 270 hertz.

FIG. 9 is a flow chart illustrating another method for operating a display device, according to an embodiment. The steps of method may be performed in different orders, and the method may include different, additional, or fewer steps.

Pulses of colored light are emitted 910 from a backlight unit (BLU), wherein colored light of a first pulse includes first and second colors (e.g., red and blue), and colored light of a second pulse includes a third color (e.g., green). The BLU can include a light guiding plate and a plurality of light-emitting diodes (LEDs) arranged along one or more peripheries of the light guiding plate to emit pulses of the colored light to the LCD panel via the light guiding plate. In some embodiments, the first color is one of red, green, and blue; the second color is another of the red, the green, and the blue; and the third color is a remaining color of the red, the green and the blue. The pulses of colored light may only include the first pulses and the second pulses.

The second color (e.g., blue) is, at least partially, blocked 920 but the first color and the third color (e.g., red and green) are passed by first subpixels in a liquid crystal display (LCD) panel positioned in front of the BLU.

The first color (e.g., red) is, at least partially, blocked 930 but the second color and the third color (e.g., blue and green) are passed by second subpixels in the LCD panel. The first subpixel and the second subpixel may be components of a pixel and may be placed in a same row.

In some embodiments, a timing controller controls a time duration of each pulse of colored light to adjust a color balance. The timing controller can also synchronize the pulses of colored light emitted from the BLU with an operation of the LCD panel (e.g., programming the pixels of the LCD panel). A time duration to emit a pulse of light can be less than or equal to 2 milliseconds and a rate of the pulses of the colored light is from 144 hertz to 180 hertz.

While particular embodiments and applications have been illustrated and described, it is to be understood that the invention is not limited to the precise construction and components disclosed herein and that various modifications, changes and variations may be made in the arrangement, operation, and details of the method and apparatus disclosed herein without departing from the spirit and scope of the present disclosure.

What is claimed is:

1. A display device comprising:
 a backlight unit (BLU) configured to sequentially emit pulses of different colored light during an image frame period of a plurality of image frame periods for displaying images by the display device, the BLU comprising a plurality of light sources to emit the pulses of different colored light;
 a liquid crystal display (LCD) panel including a plurality of pixels and positioned in front of the BLU; and
 an LCD driver circuit configured to, during the image frame period, control the plurality of pixels to selectively pass portions of the pulsed colored light from the BLU through the plurality of pixels, wherein the LCD driver circuit comprises a gate driver having gate terminals, each gate terminal configured to send a gate signal to a plurality of rows of the plurality of pixels in the LCD panel, wherein a gate terminal of the gate terminals is configured to send a gate signal to at least three rows of the plurality of pixels in the LCD panel.

2. The display device of claim 1, wherein the LCD driver is configured to program the plurality of pixels for each of the pulses of color light before the BLU emits each of the pulses of the colored light.

3. The display device of claim 1, wherein the BLU emits pulses of red light, green light, and blue light in a sequence during the image frame period.

4. The display device of claim 3, wherein the sequence is predetermined.

5. The display device of claim 3, wherein the BLU further emits a pulse of white light in the sequence with the red light, the green light, and the blue light.

6. The display device of claim 1, wherein the LCD panel does not include color filters.

7. The display device of claim 1, wherein the BLU includes a light guiding plate and a plurality of light-emitting diodes (LEDs) arranged along one or more peripheries of the light guiding plate to emit pulses of the colored light to the LCD panel via the light guiding plate, wherein the plurality of LEDs are the plurality of light sources.

8. The display device of claim 1, further comprising a timing controller configured to control a time duration of each pulse of colored light to adjust a color balance.

9. The display device of claim 8, wherein the timing controller is further configured to synchronize the pulses of colored light emitted from the BLU with an operation of the LCD driver.

10. The display device of claim 8, wherein the time duration of the LCD panel is less than or equal to 2 milliseconds and a rate of the pulses of the colored light is from 216 hertz to 270 hertz.

11. The display device of claim 1, wherein the LCD driver circuit further comprises a data driver having data terminals, each of the data terminals configured to send a data signal to a subset of the plurality of pixels in a column of the plurality of pixels in a time multiplexed manner via one of a plurality of data lines, more than one of the data lines extending between adjacent columns of the plurality of pixels.

12. The display device of claim 1, wherein a frame rate of the display device is between 72 hertz and 90 hertz.

13. A method of operating a display device comprising:
 during an image frame period of a plurality of image frame periods for displaying images by the display device, controlling a plurality of pixels in a liquid crystal display (LCD) panel by an LCD driver circuit, wherein the LCD driver circuit comprises a gate driver having gate terminals, each gate terminal configured to send a gate signal to a plurality of rows of the plurality of pixels in the LCD panel, wherein a gate terminal of the gate terminals is configured to send a gate signal to at least three rows of the plurality of pixels in the LCD panel;
 during the image frame period, sequentially emitting pulses of different colored light from a backlight unit (BLU) positioned at a backside of the LCD panel, the BLU comprising a plurality of light sources to emit the pulses of different colored light; and
 selectively passing portions of the pulsed colored light from the BLU through the plurality of pixels.

14. The method of claim 13, wherein the LCD driver circuit programs the plurality of pixels for each of the pulses of color light before the BLU emits each of the pulses of the colored light.

15. The method of claim 13, wherein the BLU emits pulses of red light, green light, and blue light in a predetermined sequence during the image frame period.

16. The method of claim 15, wherein the BLU further emits a pulse of white light in the predetermined sequence with the red light, the green light, and the blue light.

17. The method of claim 13, wherein the LCD panel does not include color filters.

18. The method of claim 13, wherein the BLU includes a light guiding plate and a plurality of light-emitting diodes (LEDs) arranged along one or more peripheries of the light guiding plate to emit pulses of the colored light to the LCD panel via the light guiding plate, wherein the plurality of LEDs are the plurality of light sources.

19. The method of claim 13, further comprising: controlling, by a timing controller, a time duration of each pulse of colored light to adjust a color balance.

20. The method of claim 19, wherein the time duration is less than or equal to 2 milliseconds and a rate of the pulses of the colored light is from 216 hertz to 270 hertz.

21. The method of claim 19, further comprising: synchronizing, by the timing controller, the pulses of colored light emitted from the BLU.

22. The method of claim 13, wherein the LCD driver circuit further comprises a data driver having data terminals, each of the data terminals configured to send a data signal to a subset of the plurality of pixels in a column of the plurality of pixels in a time multiplexed manner via one of a plurality of data lines, more than one of the data lines extending between adjacent columns of the plurality of pixels.

\* \* \* \* \*